United States Patent [19]
Ueda et al.

[11] Patent Number: 5,278,928
[45] Date of Patent: Jan. 11, 1994

[54] OPTICAL FIBER CONNECTOR HAVING A GLASS FERRULE COVERED BY A THIN REINFORCING LAYER

[75] Inventors: Tetsuji Ueda; Yasuhisa Tanisawa, both of Tokyo, Japan

[73] Assignee: NEC Corporation, Tokyo, Japan

[21] Appl. No.: 873,799

[22] Filed: Apr. 27, 1992

[30] Foreign Application Priority Data

Apr. 26, 1991 [JP] Japan ................... 3-097335

[51] Int. Cl.⁵ ............................................. G02B 6/36
[52] U.S. Cl. ........................................ 385/78; 385/84; 385/128
[58] Field of Search ............... 385/78, 123, 126, 127, 385/128, 84, 85

[56] References Cited

U.S. PATENT DOCUMENTS

| | | | |
|---|---|---|---|
| 4,384,038 | 5/1983 | Khoe et al. | 385/14 |
| 4,585,304 | 4/1986 | Winter et al. | 385/72 |
| 4,753,501 | 6/1988 | Battle | 385/25 |
| 4,753,510 | 6/1988 | Sezerman | 385/66 |
| 5,037,180 | 8/1991 | Stone | 385/123 |

FOREIGN PATENT DOCUMENTS

2-253207 10/1990 Japan .

Primary Examiner—Frank Gonzalez
Attorney, Agent, or Firm—Foley & Lardner

[57] ABSTRACT

Optical fiber connector comprises a ferrule receiving an optical fiber and a sleeve member for holding the ferrule. The body of the ferrule is made of glass on which a thin layer is deposited for reinforcement of the body. The thin layer may be made by hydrolysis, chemical vapor deposition, spray coating etc. The ferrule of the optical fiber connector is inexpensive, easy to assemble and suitable for mass production.

10 Claims, 3 Drawing Sheets

OPTICAL FIBER CONNECTOR HAVING A GLASS FERRULE COVERED BY A THIN REINFORCING LAYER

BACKGROUND OF THE INVENTION

The present invention relates to an optical fiber connector, and more particularly to the structure of a ferrule of an optical fiber connector.

An optical fiber connector is a device used in almost every optical communication device or other optical equipment, and is provided for coupling two optical fibers or an optical fiber with a light-emitting or light-receiving device or the like.

An example of a conventional optical fiber connector is described, for example, in Japanese Patent Laid-open Publication No. Hei-2-253207. FIG. 4 shows an optical fiber connector of this type which comprises a ferrule 2 made of ceramic, and a sleeve member 3 made of stainless steel supporting and securing the rear part of the ferrule 2 at the front bore 3A of the sleeve member 3. The ferrule 2 receives within a central orifice thereof an optical fiber 1 composed of a core and a clad layer.

It is necessary to manufacture the ferrule 2 depicted in FIG. 4 out of a stiff material, e.g. ceramic as in the case of the publication above mentioned, and it is not practical to manufacture the ferrule out of a cheep and brittle glass material, since the glass ferrule would be split by even a moderate external force, causing disconnection of the optical fiber 1. Consequently, an optical fiber connector of this type is expensive due to the expensive material for the ferrule.

Besides, to manufacture the ferrule 2 shown in FIG. 4, it is necessary to grind the outer surface of the ferrule with good accuracy. As shown in FIG. 5, such grinding is usually carried out with a grinding tool 10 the position of which is adjustable in the directions shown by arrows A, and co-operative supporting means 9 rotatably supporting the ferrule 2 at the both ends of the ferrule. The grinding of the work-piece is carried out one by one, so that the ferrule of this type is not adapted for mass production.

FIG. 6 shows another type of a conventional optical fiber connector in which a glass capillary tube 7 for receiving an optical fiber 1 is protected by a sleeve member 8 made of stainless steel. The sleeve member 8 entirely covers at the front part thereof the capillary tube 7 made of a brittle material, i.e. glass, thus avoiding the problem relating to a glass ferrule having the shape depicted in FIG. 4. The optical fiber connector shown in FIG. 6 is, however, also expensive due to the complicated structure of the sleeve member 8 receiving entirely the glass capillary tube 7 and holding the front end of the outer sheath 6 of the optical fiber cable. This structure is also necessary to grind the outer surface of the ferrule with good accuracy.

SUMMARY OF THE INVENTION

An object of the invention is to provide an optical fiber connector of a simple structure which can be manufactured at a relatively low cost and is suitable for mass production.

According to the invention, there is provided an optical fiber connector in which the body of the ferrule is made of glass and a thin layer is deposited on the surface of the body for reinforcement.

In accordance with the invention, since the ferrule is basically composed of an inexpensive glass and a thin layer for reinforcement, the optical fiber connector of the invention can be manufactured at a relatively low cost and is adapted for mass production. The thin layer deposited on the surface of the glass ferrule serves as reinforcement for a glass ferrule, which does not substantially require any protective sleeve member thereon in practical use for an optical fiber connector.

Although the theoretical strength of glass is generally high enough for implementing a ferrule, the substantial strength of a glass depends on existing cracks marked on the surface thereof. If a glass has a crack of several $\mu m$ depth on the surface, for example, it may be split by as much a stress as 1/100 of the theoretical allowable stress for a glass without a crack.

Since the thin layer deposited on the surface of the body of the glass ferrule attaches firmly to the surface of the glass and serves as reinforcement for the glass with the strength of the thin layer itself, the strength of the ferrule can be improved.

Besides, the thin layer covering the surface of the ferrule acts to prevent cracks on the surface of the ferrule. The thin layer also fills in the existing crack on the surface of the glass. Consequently, the thin layer also serves as reinforcement for the glass body by covering the surface of the glass body. After deposition of a thin layer, even when a crack is formed on the thin layer, the boundary between the thin layer and the glass body prevents the crack from growing into the glass ferrule body.

Depositing a thin layer on the surface of the body of a glass ferrule can be carried out by various methods, e.g. spray coating for depositing a thin layer of $SnO_2$ and hydrolysis for depositing a thin layer of $SiO_2$, $TiO_2$, ceramics or the like. Electroless plating, chemical vapor deposition, and physical vapor deposition are also available for this purpose.

BRIEF EXPLANATION OF THE DRAWINGS

These and other features and advantages of the present invention will be more apparent from the following description of exemplary embodiments thereof, as illustrated in the accompanying drawings, in which.

DETAILED DESCRIPTION OF THE PREFERRED EMBODIMENTS

Figure 1:
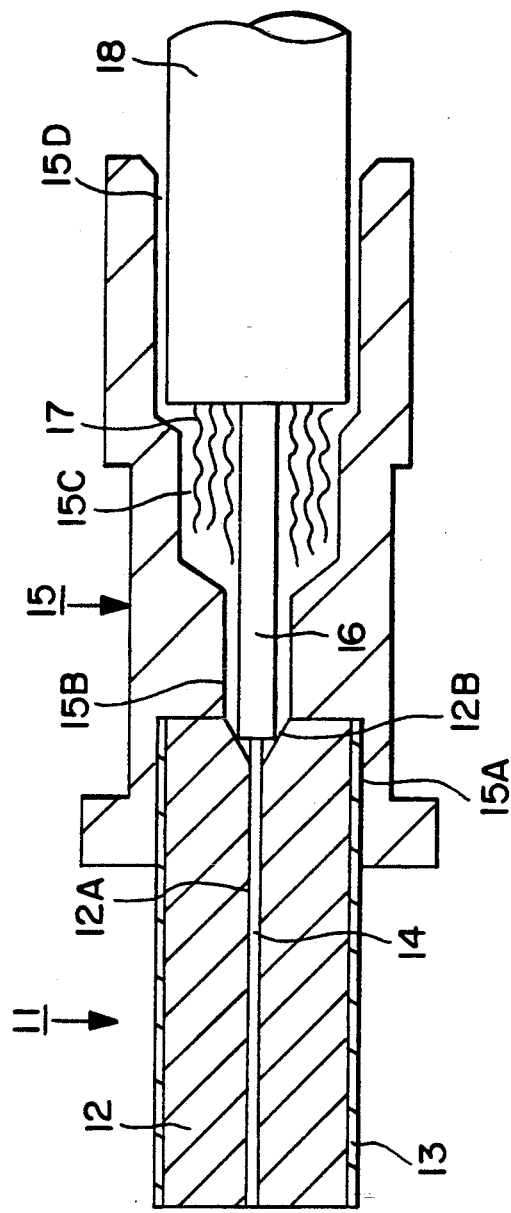
FIG. 1 is a longitudinal sectional view of an embodiment of an optical fiber connector according to the invention.

FIG. 1 shows an embodiment of an optical fiber connector according to the invention. The connector comprises a glass ferrule 11 receiving a fiber 14 within an orifice 12A thereof, and a sleeve member 15 supporting and securing the ferrule 11. The sleeve member 15 supports the rear part of the ferrule 11 at the front bore 15A of the sleeve member 15. The ferrule 11 is firmly fixed to the sleeve member 15 with an adhesive.

The inner surface of the sleeve member 15 is formed stepwise so that the sleeve member 15 is formed with four bores different in diameter from each other. The second bore 15B adjacent to the front bore 15A is formed of a small diameter receiving a protective tubular member 16 holding the optical fiber 14 of a optical fiber cable. The third bore 15C of a medium diameter receives the protective tubular member 16 and a tension strength member 17 of the optical fiber cable. The tension strength member 17 arranged coaxially with the protective tubular member 16 is secured to the inner surface of the third bore 15c with an adhesive. The last bore 15D of a large diameter formed at the rear end of the sleeve member 15 receives an outer sheath 18 of the front portion of the optical fiber cable.

The ferrule 11 is composed of a body 12 made out of a glass material, e.g. borosilicate glass ($Na_2O.B_2O.SiO_2$) and a thin layer 13 deposited on the outer surface of the glass body 12 for reinforcement of the body 12. The body 12 is formed with an orifice 12A for receiving the optical fiber 14 coaxially with the outer surface of the ferrule 11. The diameter of the orifice 12A is substantially equal to the outer diameter of the optical fiber 14, so that the optical fiber 14 is held by the ferrule 11 in this embodiment. The surface 12B of the rear end of the orifice 12A is tapered by etching so that the fiber 14 can be easily inserted to the orifice 12A.

Figure 2:
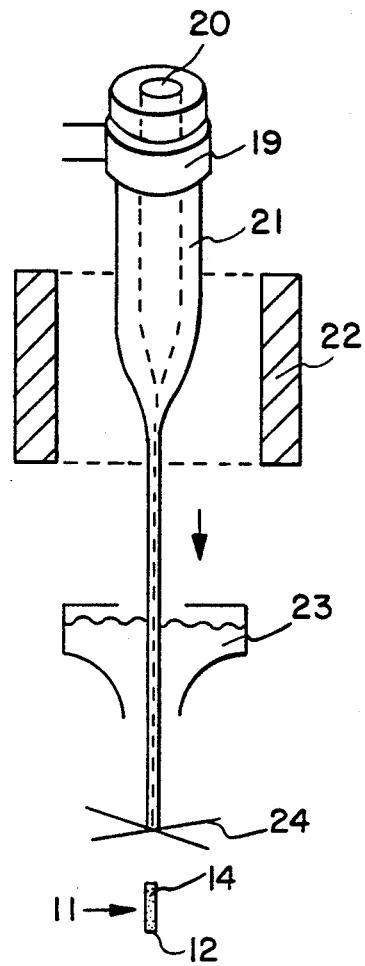
FIG. 2 is a schematic view of an example of a manufacturing facility for the ferrule of the optical fiber connector in FIG. 1.

FIG. 2 shows a schematic arrangement of an example of a manufacturing facility for the ferrule of the optical fiber connector in FIG. 1, which facility is similar to a manufacturing facility for an optical fiber. In FIG. 2, a preformed cylindrical glass 21, with a longitudinal hole 20 formed along the central axis thereof, is supported at one end by a clamp 19 of the facility above a drawing furnace 22, in which the preformed glass 21 is heated for drawing. The preformed glass 21 is pulled by a wire-drawing machine (not shown) at the other end of the cylindrical glass 21 through a film depositing apparatus 23, in which a thin layer is formed on the outer surface of the glass for reinforcement for the glass body. Then, the glass is cut with a cutter 24 into a prescribed length adapted for an optical fiber connector. The ferrule 11 is thus manufactured by the above process.

The processes for depositing a thin layer 13 by hydrolysis a method include coating, drying and burning is now described. In the hydrosis method, a glass ferrule body is immersed in a organic solvent containing at the rate of several percent silicon hydroxide or organic compound including silicon alkoxide, then pulled up at a slow rate from the solvent. The ferrule body is kept in the atmosphere for several minutes at a temperature between room temperature and 100° C., following which it is burned for an hour at a temperature of several hundred degree Celsius, resulting in a heat reaction or hydrolysis for depositing a thin layer. After cooling at a slow rate the total process is finished.

The deposition process for forming a thin layer may be repeated several times so that strong reinforcement for the ferrule is attained. For practical use of the ferrule in a optical fiber connector, however, one deposition process may be sufficient. Thickness of a $SiO_2$ thin layer, e.g. about 1000 angstrom, can be obtained in one deposition process. A $SiO_2$ thin layer is preferable, since it attaches firmly to the glass body by reaction with the surface of the glass body.

A glass ferrule of an embodiment of the connector according to the invention is obtained by the inventors through the following trial procedure:

Firstly, a ferrule body was formed by drawing a heated cylindrical glass of borosilicate, and then cooled slow to room temperature. Secondly, the ferrule body was immersed in a solution in which colloidal silica was dispersed in alcohol. The ferrule body was then pulled up at a slow rate of 100 mm/sec, following which the ferrule was dried at a room temperature, then burned for an hour at a temperature of 500° C. Lastly, the ferrule was cooled by natural cooling.

A $SiO_2$ thin layer was deposited on the surface of the glass ferrule body through the above processes. The new glass ferrule obtained by this process proved 30% stronger in flexural strength than the glass ferrule without a layer.

Chemical vapor deposition enables to form, for example, a $ZrO_2$ thin layer at a burning temperature between 300° and 800° C. and a $W_2C$ thin layer at a burning temperature between 400° and 700° C.

Figure 3:
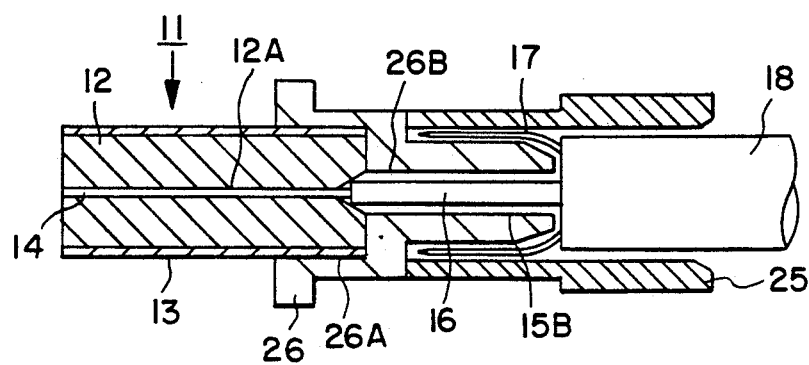
FIG. 3 is a longitudinal sectional view of another embodiment of an optical fiber connector according to the invention.
Figure 4:
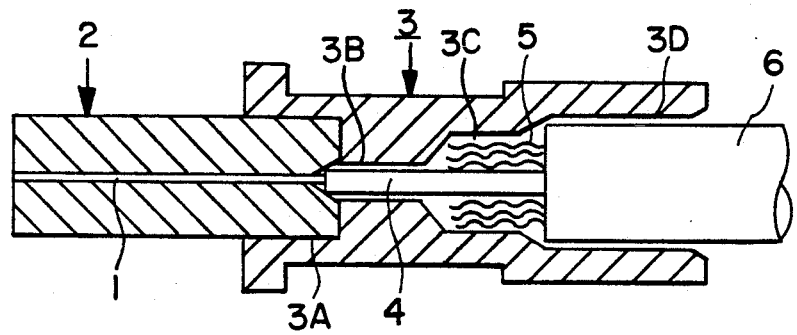
FIG. 4 is a longitudinal sectional view of an example of a conventional optical fiber connector.
Figure 5:
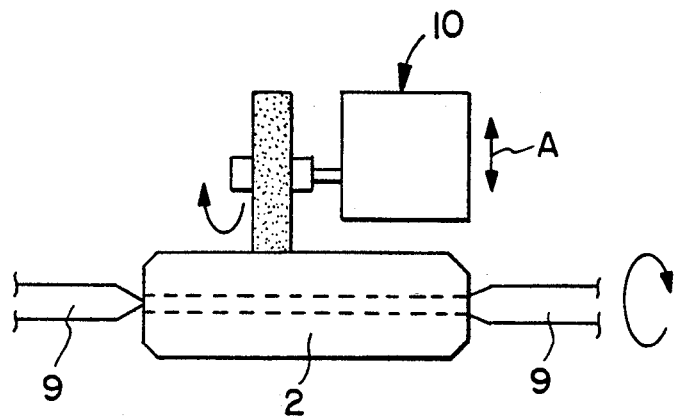
FIG. 5 is a schematic view showing a process for manufacturing the ferrule shown in FIG. 4.
Figure 6:
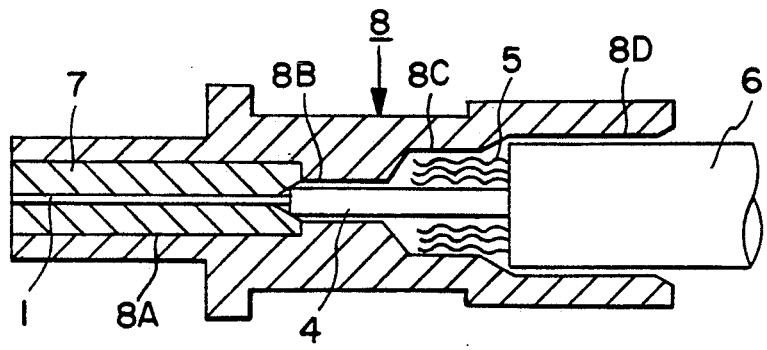
FIG. 6 is a longitudinal sectional view of another example of a conventional optical fiber connector.

FIG. 3 shows another embodiment of an optical fiber connector according to the invention. This connector comprises a collar member 25 as well as a ferrule 11 and a sleeve member 26. The ferrule 11 is the same as the one described in the first embodiment of FIG. 1, while the sleeve member 26 is formed only with a first and a second bores 26A and 26B, and smaller in length than the sleeve member 15 shown in FIG. 1. The outer diameter of the sleeve member 26 is reduced at the rear part of the sleeve member 26, so that the tension member 17 extending from inside of the end of an outer sheath 18 of the optical fiber cable is held between the reduced outer surface of the sleeve member 26 and the inner surface of the collar member 25 by a radially inward force applied at the outer surface of the collar member 25.

A ferrule body is preferably made out of an inexpensive silicate glass, especially borosilicate glass which is easy to assemble. However, the material for the ferrule body is not limited only to silicate glass. Quartz glass may be used for this purpose.

It will be understood that the above-described embodiments of an optical fiber connector according to the invention have been set forth solely by way of example and illustration thereof and that various other modifications and alterations may be made without departing from the spirit and scope of the invention.

What is claimed is:

1. An optical fiber connector comprising a ferrule for receiving an optical fiber along the central axis thereof, wherein the body of the ferrule is made out of glass and a thin layer of material covers a longitudinal surface of the body for reinforcement.

2. An optical fiber connector as defined in claim 1, wherein the glass comprises borosilicate glass.

3. An optical fiber connector as defined in claim 1, wherein the glass comprises quartz glass.

4. An optical fiber connector as defined in claim 2, wherein the thin layer comprises an oxide film.

5. An optical fiber connector as defined in claim 4, wherein the thin layer comprises $SiO_2$.

6. An optical fiber connector as defined in claim 1, wherein the thickness of the thin layer is about 1000 angstrom.

7. An optical fiber connector as defined in claim 1, further comprising a sleeve member for supporting the ferrule at the front end of the sleeve member and a collar member for holding a tension member between the collar member and the rear part of the sleeve member.

8. An optical fiber connector as defined in claim 3, wherein the thin layer comprises an oxide film.

9. An optical fiber connector as defined in claim 8, wherein the thin layer comprises SiO$_2$.

10. An optical fiber connector comprising a ferrule for receiving an optical fiber along the central axis thereof, wherein the body of the ferrule is made out of glass and a thin layer of material is deposited on the surface of the body for reinforcement, wherein said connector further comprises a sleeve member for supporting the ferrule at the front end of the sleeve member and a collar member for holding a tension member between the collar member and the rear part of the sleeve member.

* * * * *